July 16, 1968 LA FERENA BATCHELOR 3,393,000
FOOD TURNER UTENSIL
Filed Nov. 10, 1966
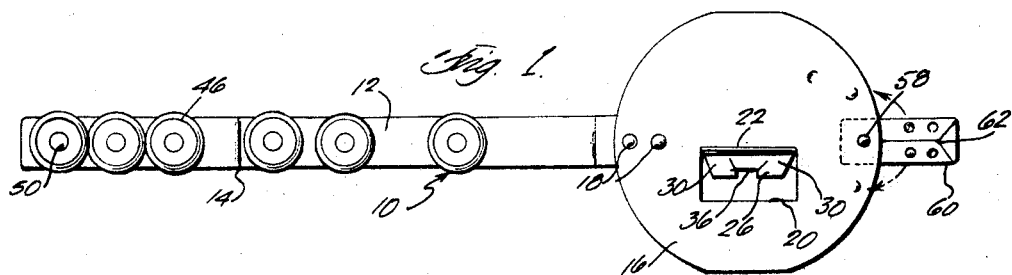
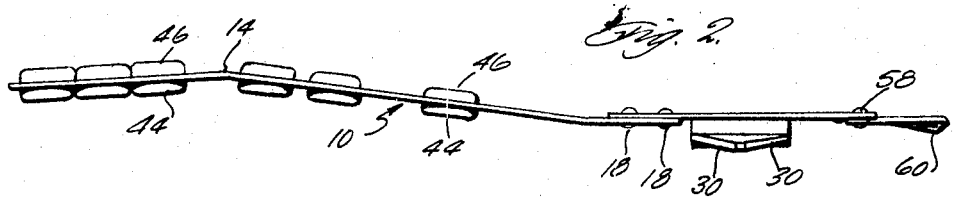
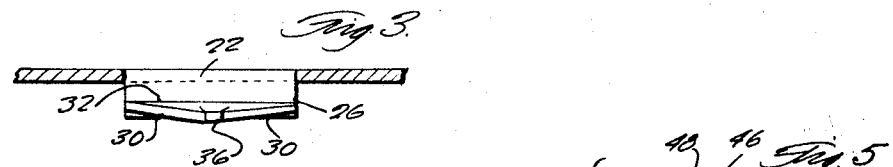
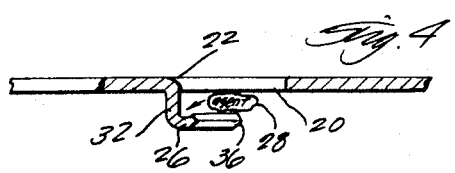
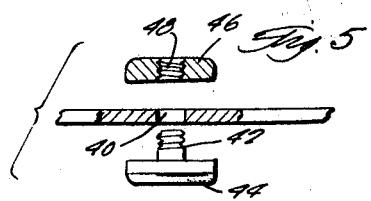
INVENTOR.
LA FERENA BATCHELOR
BY
ATTORNEYS

United States Patent Office 3,393,000
Patented July 16, 1968

3,393,000
FOOD TURNER UTENSIL
La Ferena Batchelor, 3976 S. Langley,
Chicago, Ill. 60653
Filed Nov. 10, 1966, Ser. No. 593,408
3 Claims. (Cl. 294—7)

The present invention relates to an improved kitchen utensil used for turning pancakes, French toast, fried eggs, and other foods, and more particularly relates to an improved kitchen utensil having a handle with insulating buttons disposed throughout the length of the handle, and in which a rectangular aperture having an L-shaped extension from an edge thereof provides for distribution of melted frying and cooking agents, butter and the like, and in which there may also be provided a rivet-mounted slotted trough on the distant edge of the plate of the kitchen utensil and in general axial alignment with the handle thereof.

More particularly, the invention is directed to obtaining improved distribution and the dispensing of melted frying agents throughout the hot plate, grill, or other environment in which the kitchen utensil is used.

An object therefore of the present invention is to provide a frying or cooking agent scoop located under an aperture in the turnover plate of the kitchen utensil that can scoop up solid butter for improved distribution and dispensing throughout the frying pan, as well as dip up and scoop up other solids and liquids sought to be cooked and distributed.

A further object of the present invention is to provide a metal handle for a kitchen utensil used in cooking in which there are a series of wood or insulating buttons which engage and are mounted from openings along the handle, so that if they are provided to allow the handle to be picked up and used when it is heated.

A further object of the present invention is to provide a kitchen utensil that allows snagging up, scooping up, and distributing solid or liquid butter or other frying agents with the scoop means that is mounted under the turner plate.

A further object of the present invention is to provide a turning plate for a kitchen utensil for use in turning the food over to be cooked and also correspondingly used for distributing the food about the cooking surface, such as in stirring and the cooking of an omelet and the like.

A further object of the present invention is to provide a liquid dipper at the distant end of the food turner that can be used in other kinds of frying in preparing a skillet, frying pan or grill for the cooking of foods thereon.

The above and other objects and advantages of tne invention will become apparent upon full consideration of the following detailed description and accompanying drawings in which:

FIGURE 1 is a plan view of the kitchen utensil showing the preferred embodiment of the present invention.

FIGURE 2 is a side elevational view thereof.

FIGURE 3 is an enlarged and cross-sectional view of the L-shaped configuration means shown generally in FIGURES 1 and 2.

FIGURE 4 is a side elevational view thereof, and

FIGURE 5 is an exploded cross-sectional view of the insulation buttons that are mounted along the handle of the kitchen utensil.

Referring now to the drawings, there is shown a kitchen utensil 10 having a handle 12, which may have a bend 14 at an intermediate portion thereof, and a turn-over plate 16 at the other secured to the handle by rivets 18, 18.

The plate 16 is of generally symmetrical configuration about the axis of the handle, and the plate has an eccentrically positioned opening 20 which is generally rectangular in shape and size. From an edge 22 of the opening 20 there is projected downwardly an extension consisting of an L-shaped configuration 26 as shown in FIGURES 1, 2, 3, and 4, and which provides for the scooping up and receiving of a liquid or a solid frying agent shown in FIGURE 4 as the arrow 28. The L-shaped member or configuration 26 has its lower horizontal member or surface disposed so that the outer free surfaces 30, 30 adjacent to the fold 32 incline generally inward and downward terminating at a center 36 at the forward free edge of the member 26.

Throughout the handle 12, there are disposed a series of axially aligned openings or holes 40 as shown in FIGURE 5 through which is passed a threaded member 42 having a large head 44 and constructed entirely of heat insulating material. The threaded portion 42 engages a button 46 having an internally threaded portion 48 as is shown in FIGURE 5. The end button may have an aperture passing through its entirety to provide means for hanging the kitchen utensil and it is shown as a hole 50.

On the other end of the kitchen utensil and in generally axial alignment with the handle, there is provided a further rivet 58 from which is pivotally mounted from the underside of the plate 16, a slotted trough 60 for receiving solid frying and cooking agents therein and in which the heat that is accumulated in the plate 16 and slotted trough 60 is sufficient to melt the solid agent for dispensing from the trough portion 62 of the element 60. By the position in which the slotted trough 60 is held in one's hand, the frying agent may be retained within the trough 60 and as the agent is melted, it is dispensed from the trough portion 62.

Additional embodiments of the invention in this specification will occur to others and therefore it is intended that the scope of the invention be limited only by the appended claims and not by the embodiment described here and above. Accordingly reference should be made to the following claims in determining the full scope of the invention.

What is claimed in:

1. A kitchen utensil comprising a food turner having a handle at one end and a turn-over plate at the other,
   said handle having a series of centrally disposed apertures,
   and a threaded screw and button combination consisting of entirely heat insulated material mounted on each aperture,
   said plate having an eccentrically disposed opening generally rectangular in nature and having an extension of L-shaped configuration extending from an edge of said opening for receiving and scooping up liquid or solid frying agents.

2. The invention of claim 1, wherein said extension has centrally inclined portions terminating at a free edge of the lower member of said configuration.

3. The invention of claim 2, wherein an edge of said plate, axial and distal of said handle is provided with a slotted trough pivotally mounted to said edge for dispensing melted frying agent therefrom.

References Cited
UNITED STATES PATENTS 3,250,561   5/1966   Wilson _____ 294—7

EVON C. BLUNK, Primary Examiner.

R. D. GUIOD, Assistant Examiner.